(12) United States Patent
Takagi

(10) Patent No.: US 11,281,080 B2
(45) Date of Patent: Mar. 22, 2022

(54) LIGHT SOURCE DEVICE AND PROJECTOR

(71) Applicant: SEIKO EPSON CORPORATION, Tokyo (JP)

(72) Inventor: Kunihiko Takagi, Okaya (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/942,869

(22) Filed: Jul. 30, 2020

(65) Prior Publication Data

US 2021/0041775 A1 Feb. 11, 2021

(30) Foreign Application Priority Data

Aug. 6, 2019 (JP) .............................. JP2019-144504

(51) Int. Cl.
| | | |
|---|---|---|
| G03B 21/14 | (2006.01) | |
| G03B 21/16 | (2006.01) | |
| G03B 21/20 | (2006.01) | |
| G03B 33/12 | (2006.01) | |

(52) U.S. Cl.
CPC .......... *G03B 21/145* (2013.01); *G03B 21/16* (2013.01); *G03B 21/204* (2013.01); *G03B 33/12* (2013.01)

(58) Field of Classification Search
CPC ...... G03B 21/00–64; H04N 9/31–3197; F21K 9/64; G02B 26/008
See application file for complete search history.

(56) References Cited

U.S. PATENT DOCUMENTS

| | | | | |
|---|---|---|---|---|
| 2012/0057219 | A1* | 3/2012 | Suyama | ................. G02B 7/003 359/328 |
| 2013/0135593 | A1* | 5/2013 | Saitou | .................. G03B 21/204 353/31 |
| 2016/0182869 | A1 | 6/2016 | Fukano | |
| 2017/0192346 | A1* | 7/2017 | Chikayama | .......... G03B 21/204 |
| 2017/0357150 | A1* | 12/2017 | Ueda | ..................... F21V 29/502 |
| 2017/0363939 | A1* | 12/2017 | Yoshida | ............... G02B 26/008 |
| 2018/0231877 | A1* | 8/2018 | Kikuchi | ............... G02B 26/008 |
| 2018/0292740 | A1 | 10/2018 | Takagi | |
| 2019/0278162 | A1 | 9/2019 | Yanai | |
| 2019/0391385 | A1* | 12/2019 | Mashimo | ............. H04N 9/3152 |

FOREIGN PATENT DOCUMENTS

| | | |
|---|---|---|
| JP | 2016-118653 A | 6/2016 |
| JP | 2018-180107 A | 11/2018 |
| JP | 2018-190664 A | 11/2018 |
| JP | 2019-152831 A | 9/2019 |

* cited by examiner

*Primary Examiner* — Michelle M Iacoletti
*Assistant Examiner* — Christopher A Lamb, II
(74) *Attorney, Agent, or Firm* — Dority & Manning, P.A.

(57) ABSTRACT

A light source device of the present disclosure includes a light source, a wavelength conversion unit having a fluorescent material excited by a light output from the light source and generating fluorescence and a fluorescent material supporting substrate supporting the fluorescent material, and a housing part with the light source fixed thereto supporting the wavelength conversion unit, wherein the wavelength conversion unit is shiftably supported relative to the housing part.

13 Claims, 9 Drawing Sheets

LIGHT SOURCE DEVICE AND PROJECTOR

The present application is based on, and claims priority from JP Application Serial Number 2019-144504, filed Aug. 6, 2019, the disclosure of which is hereby incorporated by reference herein in its entirety.

BACKGROUND

1. Technical Field

The present disclosure relates to a light source device and projector.

2. Related Art

Recently, as a light source device for projector, a light source device using a laser light source and a fluorescent material has attracted attention. Generally, it is known that fluorescence conversion efficiency is improved by cooling of a fluorescent material. In a light source device disclosed in JP-A-2018-180107, a fluorescent material is cooled by thermal coupling of a supporting member to which a substrate supporting the fluorescent material is attached and a cooling device that releases heat generated in a light emitting device outputting excitation light.

Further, when the fluorescent material is degraded due to temperature rise, it may be harder to efficiently generate fluorescence. Accordingly, as in a light source device disclosed in JP-A-2018-190664, a technique for suppressing reduction of an amount of fluorescence due to degradation of a fluorescent material by shift of a collection position of excitation light on the fluorescent material to prevent the fluorescent material from being exposed to the high-energy excitation light for a long time is also known.

However, in the light source device disclosed in JP-A-2018-190664, the collection position of excitation light is shifted, and thereby, the optical path of the fluorescence output from the fluorescent material changes and the incident position of the fluorescence to an optical component placed at the downstream of the light source device changes. Then, a problem that entry of the fluorescence into the optical component at the downstream of the light source device is inefficient and light use efficiency of fluorescence is lower may arise. Therefore, provision of a technique for efficiently using fluorescence with suppressed reduction of the amount of fluorescence due to degradation of the fluorescent material is desired.

SUMMARY

A light source device according to a first aspect of the present disclosure includes a light source, a wavelength conversion unit having a fluorescent material excited by a light output from the light source and generating fluorescence and a fluorescent material supporting substrate supporting the fluorescent material, and a housing part with the light source fixed thereto supporting the wavelength conversion unit, wherein the wavelength conversion unit is shiftably supported relative to the housing part.

The light source device may further include shift mechanism that shifts the wavelength conversion unit relative to the housing part.

The light source device may further include a collection system unit having a collection system that collects the light output from the light source to the fluorescent material and a holding member that holds the collection system, and the holding member may be fixed to the housing part.

A first elastic member may be provided between the holding member and the fluorescent material supporting substrate.

A second elastic member may be provided between the holding member and the housing part.

The light source device may further include a cooling member fixed to the fluorescent material supporting substrate and releasing heat generated in the fluorescent material, and a third elastic member may be provided between the cooling member and the housing part.

The light source device may further include a first urging member that urges the cooling member to the housing part.

The light source device may further include a second urging member that urges the cooling member to restrict shift of the wavelength conversion unit relative to the housing part.

The fluorescent material may include a plurality of fluorescent material layers, and the plurality of fluorescent material layers may be respectively placed side by side in shift directions of the wavelength conversion unit relative to the housing part on the fluorescent material supporting substrate.

The fluorescent material may have a shape elongated along shift directions of the wavelength conversion unit relative to the housing part.

A projector according to a second aspect of the present disclosure includes the light source device according to the first aspect of the present disclosure, a light modulation device that modulates the tight from the light source device according to image information, and a projection optical device that projects the light modulated by the light modulation device.

DESCRIPTION OF EXEMPLARY EMBODIMENTS

First Embodiment

Figure 1:
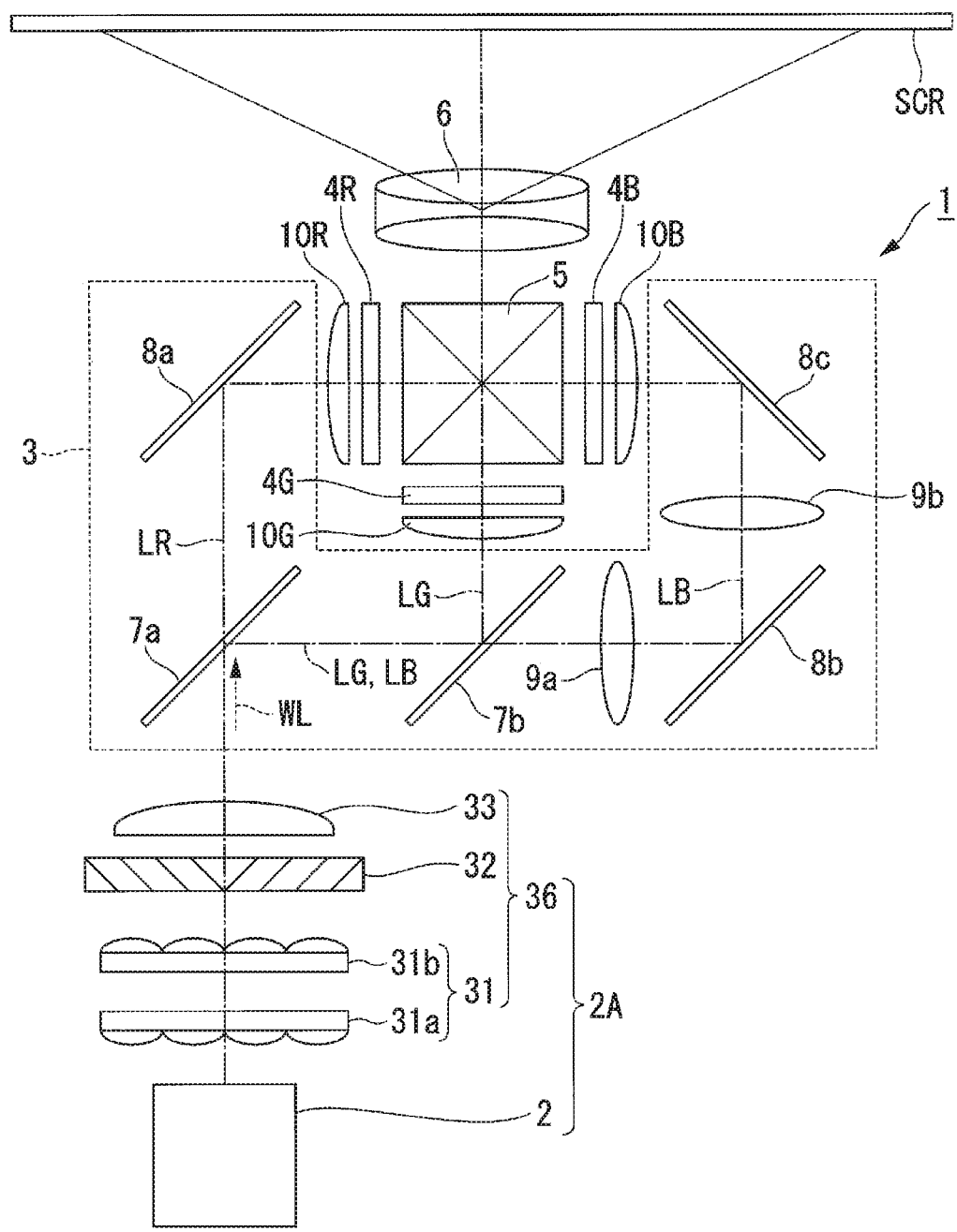
FIG. 1 is a plan view showing a schematic configuration of a projector of a first embodiment.

As below, embodiments of the present disclosure will be explained with reference to the drawings. Note that, to clearly show the characteristics, in the drawings used in the following explanation, characteristic portions may be enlarged for convenience and dimension ratios of the respective component elements are not necessarily the same as the real ratios.

Projector

FIG. 1 is the plan view showing the schematic configuration of the projector of the embodiment.

As shown in FIG. 1, a projector 1 of the embodiment is a projection image display apparatus that displays a color picture (image) on a screen SCR. The projector 1 uses three light modulation devices corresponding to respective color lights of a red light LR, a green light LG, and a blue Light LB. The projector 1 uses a semiconductor laser (laser light source) from which high-intensity and high-power light is obtained as a light source of an illumination device.

Specifically, the projector 1 includes as illumination device 2A, a color separation system 3, a light modulation device 4R, a light modulation device 4G, a light modulation device 4B, a combining system 5, and a projection optical device 6.

The illumination device 2A outputs an illumination light WL toward the color separation system 3. The illumination device 2A includes a light source device 2 and a homogenizer illumination system 36.

The homogenizer illumination system 36 includes as optical integration system 31, a polarization conversion element 32, and a superimposing system 33. Note that the polarization conversion element 32 is not essential. The homogenizer illumination system 36 homogenizes the intensity distribution of the illumination light WL output from the light source device 2 in an illuminated area.

The optical integration system 31 includes e.g. a lens array 31a and a lens array 31b. In the lens arrays 31a, 31b, plurality of lenses are arranged in array forms.

The illumination light WL passing through the optical integration system 31 enters the polarization conversion element 32. The polarization conversion element 32 includes e.g. a polarization separation film and a wave plate and converts the illumination light WL into linearly-polarized light.

The illumination light WL passing through the polarization conversion element 32 enters the superimposing system 33. The superimposing system 33 includes e.g. a convex lens and superimposes the illumination light WL output from the polarization conversion element 32 on the illuminated area. In the embodiment, the optical integration system 31 and the superimposing system 33 homogenize the illuminance distribution in the illuminated area.

The illumination light WL output from the homogenizer illumination system 36 enters the color separation system 3.

The color separation system 3 is for separation of the illumination light WL into the red light LR, the green light LG, and the blue light LB. The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the light source device 2 into the red light LR and the other lights (green light LG and blue light LB). The first dichroic mirror 7a transmits the red light LR and reflects the other lights (green light LG and blue light LB). On the other hand, the second dichroic mirror 7b separates the other lights into the green light LG and the blue light LB. The second dichroic mirror 7b reflects the green light LG and transmits the blue light LB.

The first total reflection mirror 8a reflects the red light LR transmitted through the first dichroic mirror 7a toward the light modulation device 4R. The second total reflection mirror 8b and the third total reflection mirror 8c reflect the blue light LB transmitted through the second dichroic mirror 7b toward the light modulation device 4B. The green light LG is reflected toward the light modulation device 4G by the second dichroic mirror 7b.

The first relay lens 9a and the second relay lens 9b are placed at the light exiting side of the second dichroic mirror 7b in the optical path of the blue light LB.

The light modulation device 4R modulates the red light LR according to image information and forms a red image light. The light modulation device 4G modulates the green light LG according to the image information and forms a green image light. The light modulation device 4B modulates the blue light LB according to the image information and forms a blue image light.

For the light modulation device 4R, the light modulation device 4G, and the light modulation device 4B, e.g. transmissive liquid crystal panels are used. Further, pairs of polarizers (not shown) are placed at the light incident sides and the light exiting sides of the liquid crystal panels.

At the light incident sides of the light modulation device 4R, the light modulation device 4G, and the light modulation device 4B, a field lens 10R, a field lens 10G, and a field lens 10B are placed, respectively.

The combining system 5 combines and outputs the respective image lights from the light modulation device 4R, the light modulation device 4G, and the light modulation device 4B toward the projection optical device 6. For the combining system 5, e.g. a cross dichroic prism is used.

The projection, optical device 6 includes a group of projection lenses. The projection optical device 6 enlarges and projects the image light combined by the combining system 5 toward the screen SCR.

Light Source Device

Next, the light source device 2 to which one aspect of the present disclosure is applied used for the above described illumination device 2A will be explained.

Figure 2:
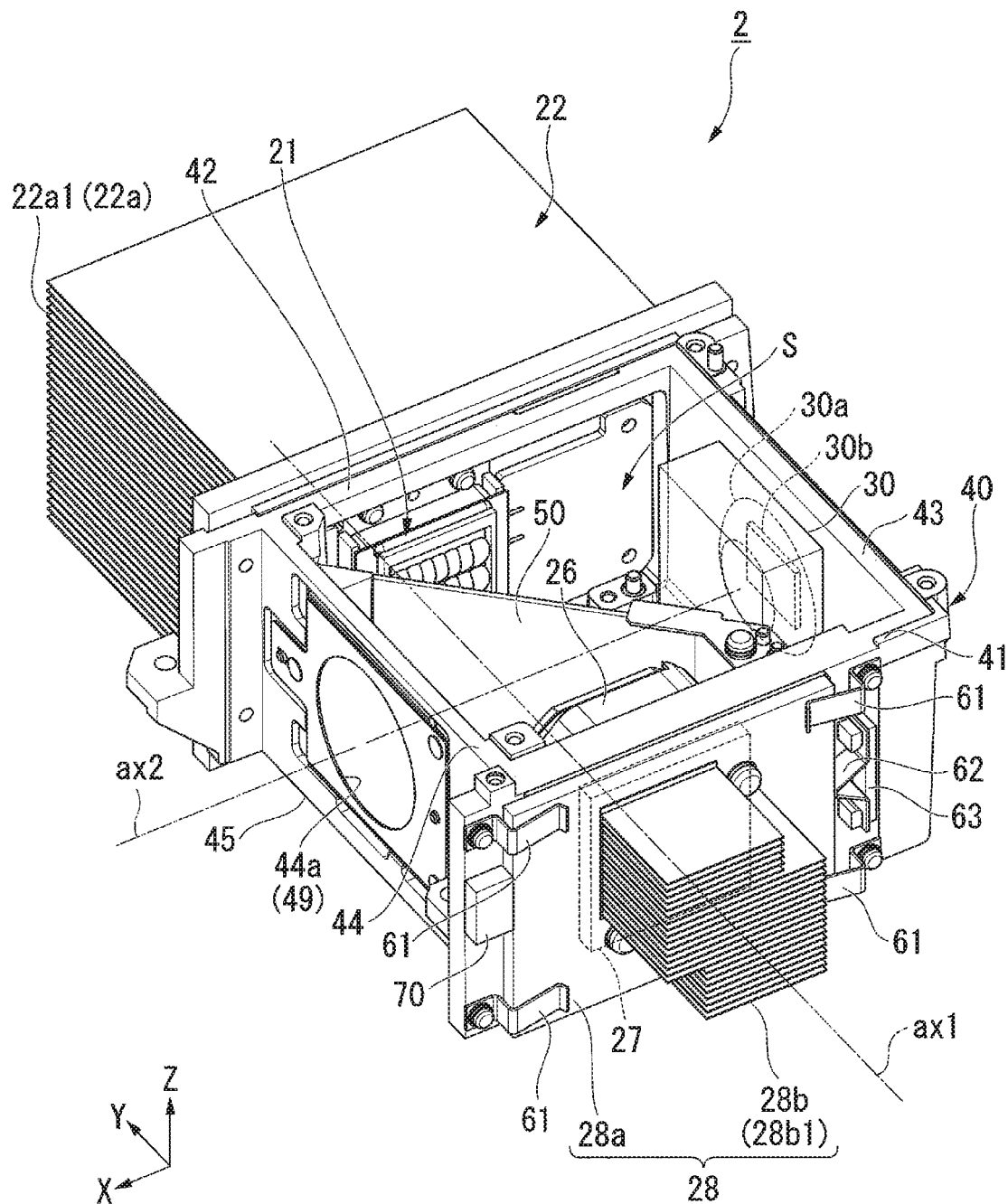
FIG. 2 is a perspective view showing a schematic configuration of a light source device.

FIG. 2 is the perspective view showing the schematic configuration of the light source device. In FIG. 2, for visibility of the drawing, the upper plate portion of the housing part is not shown. In the drawing used in the following explanation, position relationships among the respective members will be explained appropriately using an XYZ coordinate system. In FIG. 2, Z directions along a Z-axis correspond to vertical directions, X directions along an X-axis orthogonal to the Z-axis correspond to light output directions by the light source device 2, and a Y-axis is orthogonal to the X-axis and the Z-axis. Hereinafter, the +Z direction is referred to as "upside", the −Z direction is referred to as "downside", and the directions along the Z-axis are referred to as "upward and downward directions". Further, the +X direction is referred to as "left side", the −X direction is referred to as "right side", and the directions along the X-axis are referred to as "leftward and rightward directions". Furthermore, the +Y direction is referred to as "far side" and the −Y direction is referred to as "near side". Note that, in FIG. 2, the Z directions along the Z-axis are the vertical directions, and the vertical directions change according to an installation posture of the projector 1.

As shown in FIG. 2, the light source device 2 includes a light source 21, a cooling member for light source 22, a light separation element 50, a pickup lens unit (collection system unit) 26, a fluorescence emitting device (wavelength conversion unit) 27, a cooling member for fluorescent material (cooling member) 28, a diffuser unit 30, a housing part 40, and a shift mechanism 70.

The cooling member for light source 22, the light source 21, the light separation element 50, the pickup lens unit 26, the fluorescence emitting device 27, and the cooling member for fluorescent material 28 are sequentially placed on an optical axis ax1. The diffuser unit 30 and the light separation element 50 are sequentially placed on an illumination light axis ax2. The optical axis ax1 and the illumination light axis ax2 are located within the same plane and orthogonal to each other.

The housing part 40 is formed using a metallic case member. The housing part 40 has a housing space S. The housing space S houses the light source 21, the light separation element 50, the diffuser unit 30, and the pickup lens unit 26. The cooling member for light source 22 and the cooling member for fluorescent material 28 are supported by the housing part 40.

The housing part 40 has a first side plate portion 41, a second side plate portion 42, a third side plate portion 43, a fourth side plate portion 44, and a bottom plate portion 45. The pickup lens unit 26 is attached to the first side plate portion 41. The second side plate portion 42 is provided to face the first side plate portion 41 to which the light source 21 is attached. The third side plate portion 43 is a member extending in directions crossing (orthogonal to) the first side plate portion 41 and the second side plate portion 42 to which the diffuser plate 30 is attached. The fourth side plate portion 44 is a member facing the third side plate portion 43 and extending in directions crossing (orthogonal to) the first side plate portion 41 and the second side plate portion 42.

The bottom plate portion 45 is a member extending in directions crossing (orthogonal to) the first side plate portion 41, the second side plate portion 42, the third side plate portion 43, and the fourth side plate portion 44 and forming the bottom plate of the housing part 40.

The fourth side plate portion 44 has a light exiting portion 49 provided at the left side (+X side) of the light separation element 50 and transmitting the illumination light WL combined by the light separation element 50 and output toward outside. The light exiting portion 49 includes a through hole 44a penetrating the fourth side plate portion 44.

The cooling member for light source 22 includes a heatsink 22a and is thermally coupled to the light source 21. Here, thermal coupling between two members refers to a state in which heat can be transferred between the two members and includes not only direct contact between the two members but also indirect contact via a heat conduction member between the two members.

In the light source device 2 of the embodiment, the heat generated in the light source 21 is released from the cooling member for light source 22. The heatsink 22a is formed using a metal member with high radiation performance. The heatsink 22a has a plurality of fins 22a1 provided at the opposite side to the supporting surface that supports the light source 21. Note that the cooling performance of the heatsink 22a may be further improved by blowing to the plurality of fins 22a1 of the heatsink 22a by a cooling fan (not shown).

The cooling member for fluorescent material 28 is attached to the housing part 40 to cover the opening formed in the first side plate portion 41. The cooling member for fluorescent material 28 includes a supporting substrate 28a and a heatsink 28b. The heatsink 28b has a plurality of fins 28b1 provided in the supporting substrate 28a. Note that the cooling performance of the heatsink 28b may be further improved by blowing to the plurality of fins 28b1 of the heatsink 28b by a cooling fan (not shown).

The supporting substrate 28a of the cooling member for fluorescent material 28 is attached to the housing part 40 via first, spring members (first urging members) 61 and a second spring member (second urging member) 62. That is, the light source device 2 of the embodiment further includes the first spring members 61 and the second spring member 62. The first spring members 61 and the second spring member 62 are formed using e.g. leaf springs shaped by bending of metal plates in shapes having desirable spring functions. The first spring members 61 are attached to the housing part 40 via screw members 12. The second spring member 62 is attached to a spring supporting portion 63 provided on the first side plate portion 41 of the housing part 40.

In the light source device 2 of the embodiment, the fluorescence emitting device 27 is supported shiftably in the leftward and rightward directions (X-axis directions) relative to the housing part 40. The shift mechanism 70 is a mechanism of shifting the fluorescence emitting device 27 relative to the housing part 40. The configuration for shifting the fluorescence emitting device 27 relative to the housing part 40 will be described later.

Figure 3:
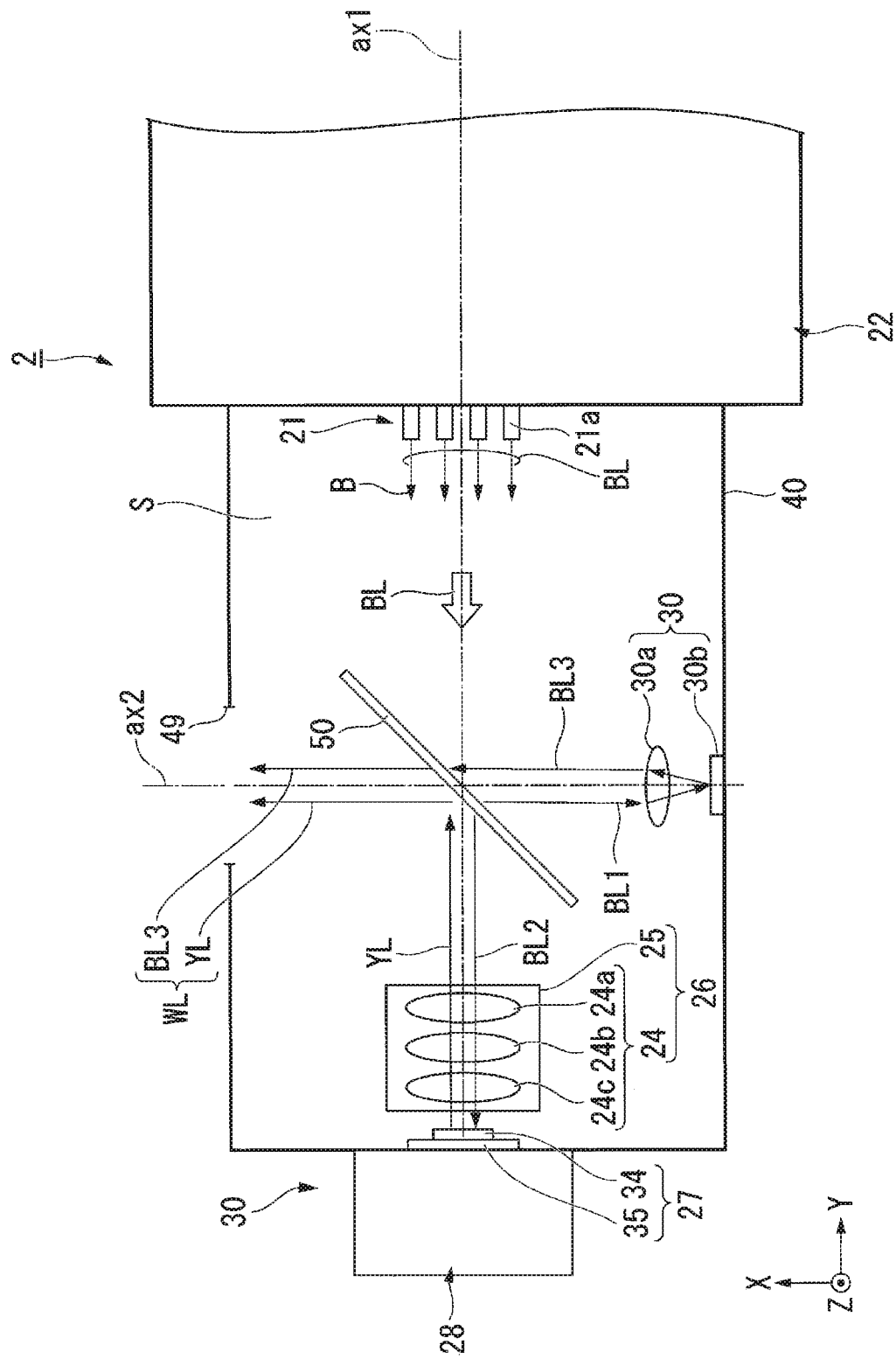
FIG. 3 schematically shows optical paths of lights passing through a housing space of a housing part.

FIG. 3 schematically shows optical paths of lights passing through the housing space of the housing part. Note that, in FIG. 3, the respective optical members through which lights pass within the housing part 40 are simplified. As shown in FIG. 3, the light source 21 includes a plurality of semiconductor lasers (light emitting devices) 21a. The light source 21 has a package structure in which the plurality of semiconductor lasers 21a are arranged in an array form within a plane orthogonal to the optical axis ax1. For example, the semiconductor laser 21a outputs a blue beam B (e.g. a laser beam having a peak wavelength of 460 nm) as excitation light, which will be described later. The beams B output from the respective semiconductor lasers 21a are converted into parallel lights by a collimator lens and output (not shown) In the embodiment, the light source 21 outputs a pencil of light BL of the plurality of beams B. Note that the number of the semiconductor lasers 21a is not limited.

The pencil of light BL enters the light separation element 50. For example, the light separation element 50 is formed using a mirror having an optical property that reflects part of the incident lights and transmits the other lights. The light separation element 50 is placed at angles of 45° relative to the optical axis ax1 and the illumination light axis ax2.

Part of the pencil of light BL is reflected by the light separation element 50 toward the diffuser unit 30. The rest of the pencil of light BL is transmitted through the light separation element 50 toward the pickup lens unit 26. Hereinafter, the part of the pencil of light BL reflected by the light separation element 50 and entering the diffuser unit 30 is referred to as "first pencil of light BL1" and the rest of the pencil of light BL transmitted through the Right separation element 50 and entering the pickup lens unit 26 is referred to as "excitation light BL2".

The diffuser unit 30 includes a pickup lens 30a and a diffuser 30b. The pickup lens 30a collects and enters the first pencil of light BL1 into the diffuser 30b. The diffuser 30b diffusely reflects the first pencil of light BL1 output from the pickup lens 30a toward the light separation element 50. Hereinafter, the light diffusely reflected by the diffuser 30b is referred to as "diffusely reflected light BL3".

The diffusely reflected light BL3 is parallelized by the pickup lens 30a and enters the light separation element 50. A light at a predetermined ratio of the diffusely reflected light BL3 entering the light separation element 50 is transmitted in the light separation element 50 toward the light exiting portion 49.

The pickup lens unit 26 collects the excitation light BL2 toward the fluorescent material of the fluorescence emitting device 27. The pickup lens unit 26 has a collection system 24 and a holding member 25 that holds the collection system 24. The collection system 24 includes a first lens 24a, a second lens 24b, and a third lens 24c. The excitation light BL2 output from the pickup lens unit 26 enters a fluorescent material 34 of the fluorescence emitting device 27.

The fluorescence emitting device 27 has the fluorescent material 34 and a fluorescent material supporting substrate 35 that supports the fluorescent material 34. Note that a reflection mirror (not shown) that reflects part of fluorescence YL generated in the fluorescent material 34 toward the outside is provided between the fluorescent material 34 and the fluorescent material supporting substrate 35. The fluorescence emitting device 27 of the embodiment is a reflective fluorescence emitting device that outputs the fluorescence YL in the opposite direction to the incident direction of the excitation light BL2.

The fluorescent material 34 of the embodiment includes fluorescent material particles that absorb and convert the excitation light BL2 into yellow fluorescence YL and output the fluorescence. As the fluorescent material particles, e.g. YAG (yttrium aluminum garnet)-containing fluorescent material may be used.

For example, as the fluorescent material 34, a fluorescent material layer formed by dispersion of fluorescent material particles in an inorganic binder of alumina or the like or a fluorescent material layer formed by sintering of fluorescent material particles without using a binder may be preferably used.

The fluorescence YL output from the fluorescent material 34 is parallelized by the pickup lens unit 26 and enters the light separation element 50. The fluorescence YL entering the light separation element 50 is reflected by the light separation element 50. The fluorescence YL reflected by the light separation element 50 is combined with the diffusely reflected light BL3 transmitted through the light separation element 50, and thereby, generates the white illumination light WL. The illumination light WL is output from the light exiting portion 49 to the outside of the housing part 40 and enters the optical integration system 31 of the homogenizer illumination system 36 shown in FIG. 1.

Figure 4:
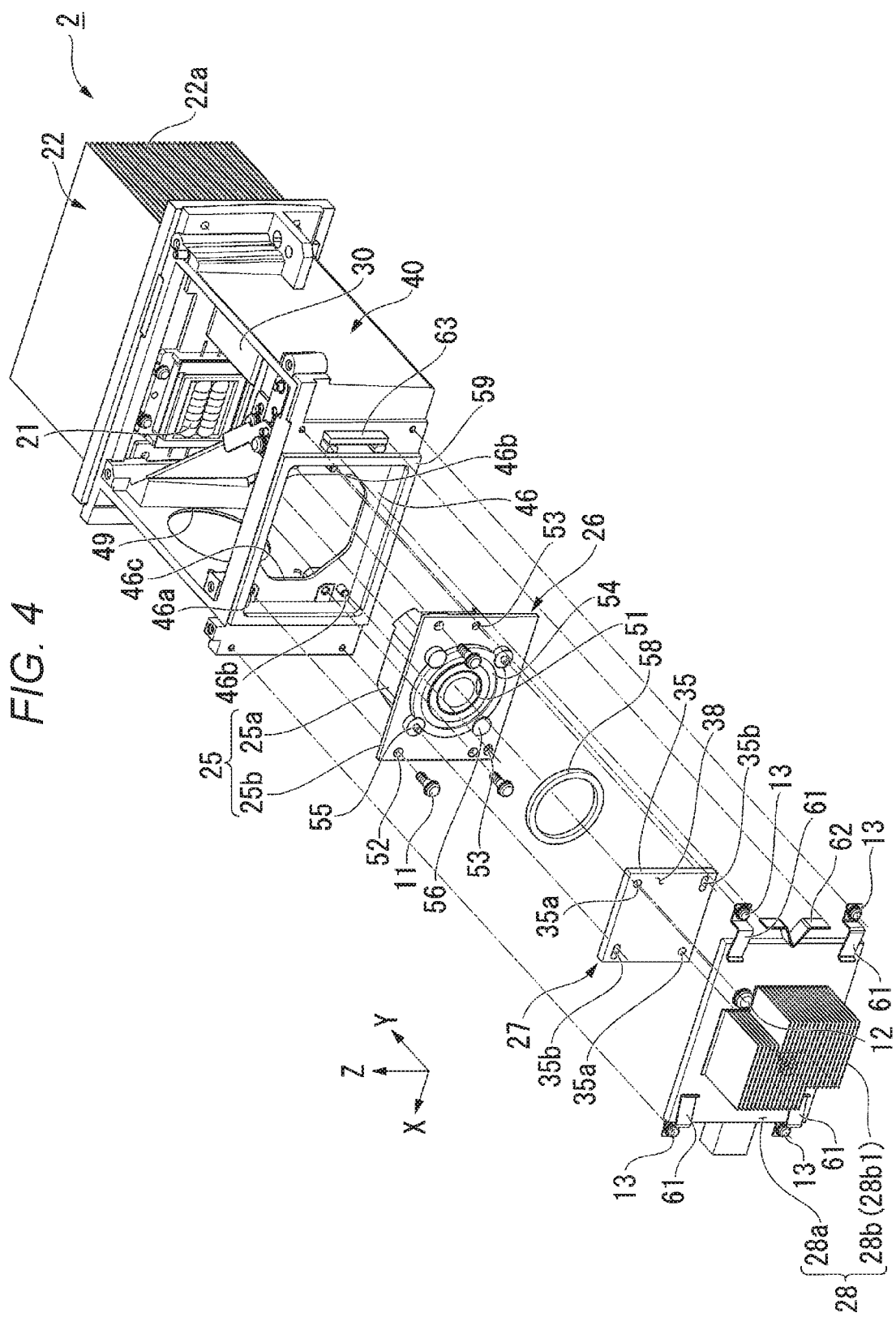
FIG. 4 is an exploded view of a main part configuration of the light source device.
Figure 5:
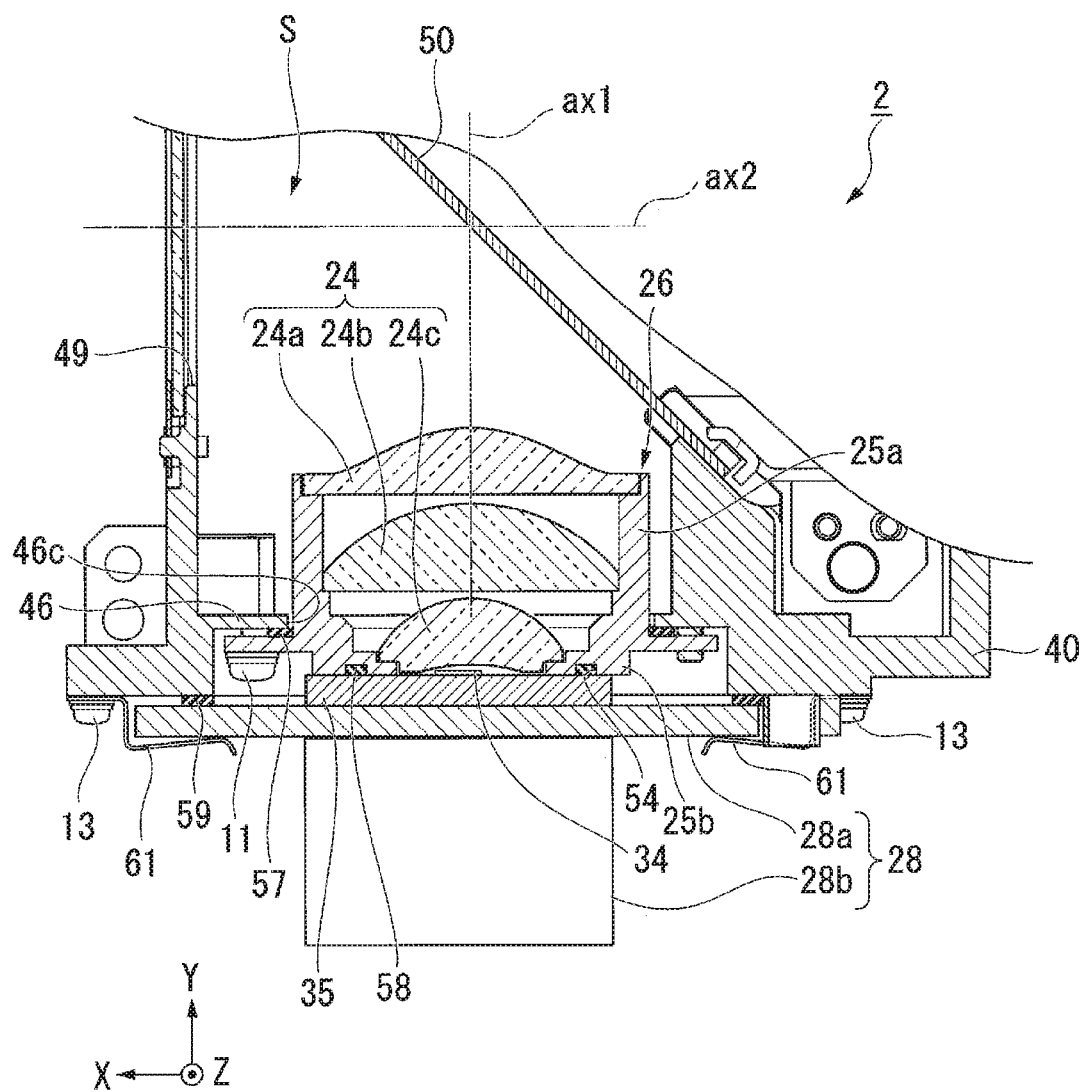
FIG. 5 is a sectional view of a main part of the light source device.

FIG. 4 is the exploded view of the main part configuration of the light source device. Specifically, FIG. 4 shows the attachment structure of the pickup lens unit 26, the fluorescence emitting device 27, and the cooling member for fluorescent material 28 to the housing part 40. FIG. 5 is the sectional view of the main part of the light source device. FIG. 5 shows the section along a plane parallel to the XY plane in the main part of the light source device 2.

As shown in FIG. 4 or FIG. 5, the pickup lens unit 26 is fixed to the housing part 40 via screw members 11. The fluorescence emitting device 27 is fixed to the cooling member for fluorescent material 28 via the screw members 12. The cool member for fluorescent material 28 is supported by the housing part 40 via the first spring members attached to the housing part 40 by screw members 13. That is, in the embodiment, the fluorescence emitting device 27 is shiftably supported by the housing part 40 via the cooling member for fluorescent material 28.

An elastic member (third elastic member) 59 is provided between the cooling member for fluorescent material 28 and the housing part 40, i.e., between the +Y side of the supporting substrate 28a of the cooling member for fluorescent material 28 and the −Y side of the housing part 40. For example, the elastic member 59 is formed using an elastic material such as rubber.

The housing part 40 has a supporting plate 46 for supporting the holding member 25. The supporting plate 46 has a plurality of screw holes 46a for fixing the pickup lens unit 26, a plurality of positioning pins 46b for positioning the pickup lens unit 26, and an opening portion 46c for insertion of the holding member 25 of the pickup lens unit 26. The supporting plate 46 of the embodiment has the three screw holes 46a and the two positioning pins 46b.

The pickup lens unit 26 is attached to the housing part 40 to be located on the optical path (optical axis ax1) of the excitation light (see FIG. 2) within the housing space S. The holding member 25 has a lens holding portion 25a and an attachment portion 25b. The lens holding portion 25a is a portion substantially in a cylindrical shape for holding the respective lenses 24a to 24c forming the collection system 24. The attachment portion 25b is a portion provided to cover the near side (one side) of the lens holding portion 25a for attaching the holding member 25 to the housing part 40.

The attachment portion 25b of the holding member 25 is provided to spread outward in the radial directions of the lens holding portion 25a. The attachment portion 25b has a lens opening portion 51, a plurality of through holes 52, a pair of pin holes 53, a ring-shaped recessed portion 54, a pair of pins 55, and a pair of supporting portions 56.

The lens opening portion 51 is provided in the center part of the attachment portion 25b. Inside of the lens opening portion 51, the third lens 24c held by the lens holding portion 25a is placed to be opposed. The through holes 52 are holes for insertion of the screw members 11 and provided in positions corresponding to the screw holes 46a formed in the supporting plate 46. The pair of pin holes 53 are holes for insertion of the positioning pins 46b of the supporting plate 46 and provided in positions corresponding to the positioning pins 46b. One of the pair of pin holes 53 is formed in an elongated hole. Thereby, the pins 46b are easily inserted into the pin holes 53. The recessed portion 54 is provided to surround the lens opening portion 51.

The pickup lens unit 26 of the embodiment is fixed to the supporting plate 46 of the housing part 40 by fastening of the screw members 11 into the screw holes 46a of the supporting plate 46 with the lens holding portion 25a inserted into the opening portion 46c of the supporting plate 46.

An elastic member (second elastic member) 57 is provided between the holding member 25 of the pickup lens unit 26 and the supporting plate 46 of the housing part 40. For example, the elastic member 57 is formed using an elastic material such as rubber.

Figure 6:
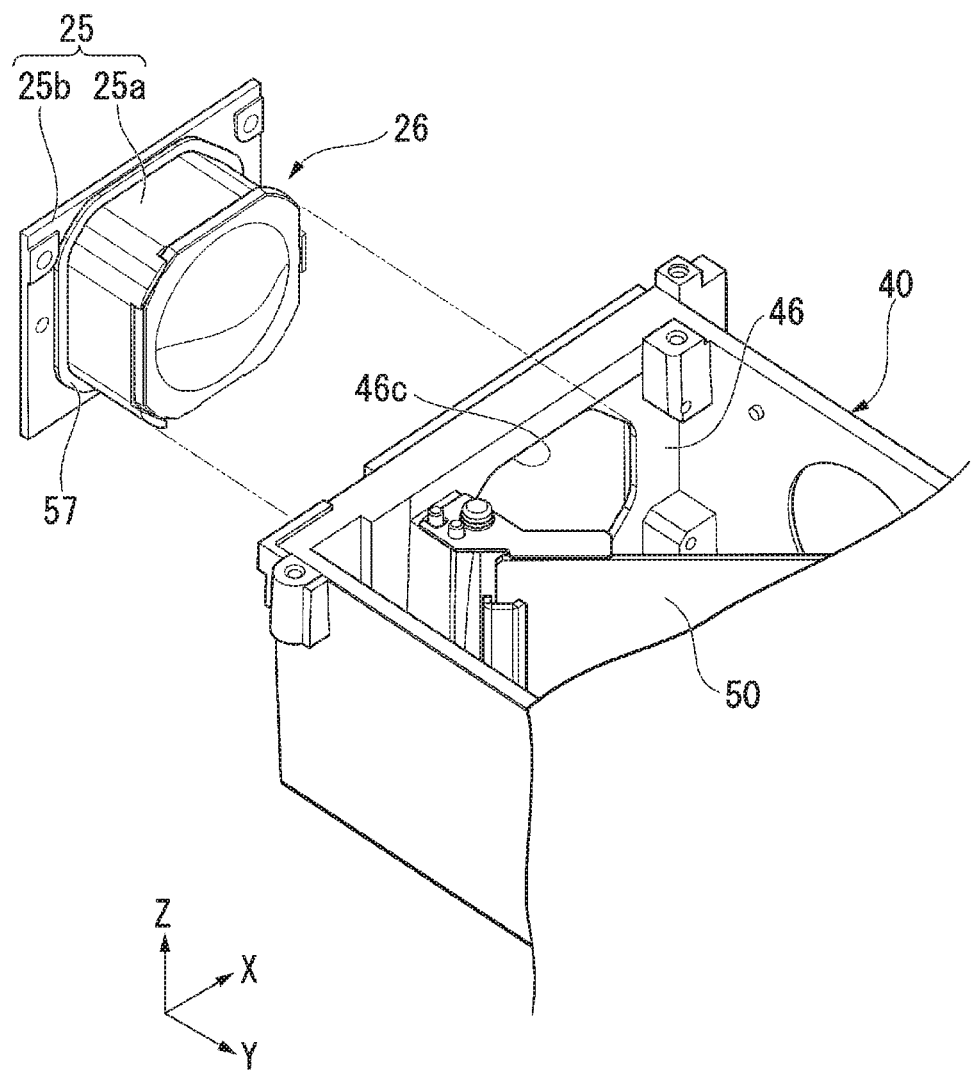
FIG. 6 is an exploded view of an attachment structure of a pickup lens unit.

FIG. 6 is the exploded view of the attachment structure to the housing part in the pickup lens unit as seen toward the near side.

As shown in FIG. 6, the elastic member 57 is placed to surround the base of the lens holding portion 25a. Accordingly, when the pickup lens unit 26 is fixed to the supporting plate 46 of the housing part 40 by the screw members 11, the elastic member 57 is pressed between the holding member 25 and the housing part 40 (see FIG. 5). That is, the elastic member 57 is provided in contact between the lens holding portion 25a side of the attachment portion 25b of the holding member 25 and the −Y side of the supporting plate 46 of the housing part 40. As described above, the elastic member 57 is provided to surround the opening portion 46c, and thereby, a gap produced between the holding member 25 closing the opening portion 46c and the housing part 40 may be filled. Thereby, the elastic member 57 closes the gap that causes communication between the housing space S within the housing part 40 and the outside and suppresses entry of dust into the housing space S.

As shown in FIG. 4, an elastic member (first elastic member) 58 is provided between the holding member 25 of the pickup lens unit 26 and the fluorescent material supporting substrate 35 of the fluorescence emitting device 27. For example, the elastic member 58 is formed using an elastic material such as rubber. The elastic member 58 is held in the recessed portion 54 formed in the attachment portion 25b of the holding member 25. In the embodiment, the depth of the recessed portion 54 is smaller than the thickness of the elastic member 58, and the elastic member 58 is provided to project relative to the surface of the attachment portion 25b. Accordingly, when the cooling member for fluorescent material 28 supporting the fluorescence emitting device 27 is attached to the housing part 40, the elastic member 58 is pressed between the holding member 25 and the fluorescent material supporting substrate 35 (see FIG. 5). As described above, the elastic member 58 is provided in the recessed portion 54, and the gap between the fluorescent material supporting substrate 35 and the holding member 25 is closed. Therefore, entry of dust into the housing space S from between the gap between the fluorescent material supporting substrate 35 and the holding member 25 may be suppressed.

In the attachment portion 25b, the pair of pins 55 and the pair of supporting portions 56 are provided outside in the radial directions of the recessed portion 54. The pair of pins 55 are provided with the lens opening portion 51 in between in the radial directions of the lens opening portion 51. The pair of pins 55 are used for positioning of the fluorescence emitting device 27.

The pair of supporting portions 56 are provided in locations different from the positions of the pair of pins 55 in the circumferential direction of the lens opening portion 51. The pair of supporting portions 56 are provided with the lens opening portion 51 in between in the radial directions of the lens opening portion 51. The pair of supporting portions 56 support the fluorescent material supporting substrate 35 of the fluorescence emitting device 27 attached to the housing part 40.

Figure 7:
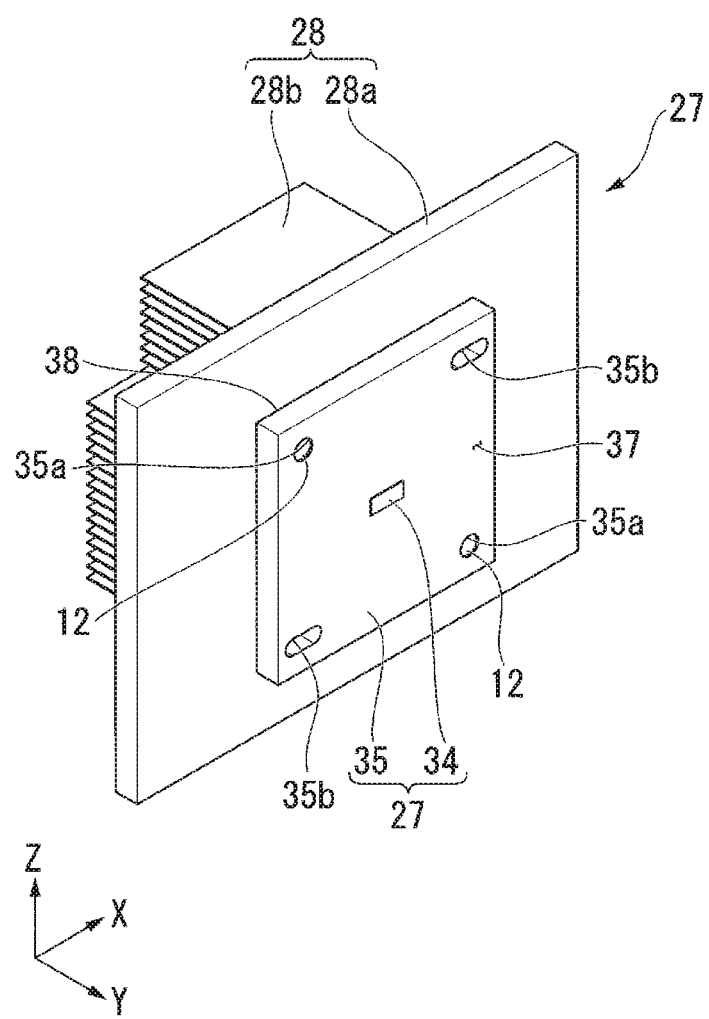
FIG. 7 is a perspective view showing a peripheral configuration of a fluorescence emitting device.

FIG. 7 is the perspective view showing the peripheral configuration of the fluorescence emitting device. As shown in FIG. 7, in the fluorescent material supporting substrate 35, the supporting substrate 28a of the cooling member for fluorescent material 28 is attached to a rear surface 38 opposite to a front surface 37 on which the fluorescent material 34 is provided via the screw members 12. For example, the fluorescent material supporting substrate 35 is formed using a highly heat conductive material such as copper.

The fluorescent material supporting substrate 35 has a pair of screw holes 35a and a pair of elongated holes 35b. The screw holes 35a and the elongated holes 35b are respectively formed in the four corners of the fluorescent material supporting substrate 35. The pair of screw holes 35a are respectively provided substantially on the diagonal line of the fluorescent material supporting substrate 35 and the pair of elongated holes 35b are respectively provided substantially on the diagonal line of the fluorescent material supporting substrate 35.

The pair of elongated holes 35b are formed in the fluorescent material supporting substrate 35 so that the length directions may coincide with each other. Specifically, the length directions of the elongated holes 35b coincide with the X directions.

The pair of pins 55 provided on the holding member 25 are respectively inserted into the pair of elongated holes 35b (see FIG. 2). The pins 55 are linearly movable in the length directions of the elongated holes 35b within the elongated holes 35b. That is, the pins 55 and the elongated holes 35b have a function of restricting the shift directions of the fluorescence emitting device 27 (fluorescent material supporting substrate 35) relative to the housing part 40.

The fluorescent material 34 of the embodiment has a shape elongated along the longitudinal directions of the elongated holes 35b. That is, the fluorescent material 34 has a shape elongated along the shift directions of the fluorescence emitting device 27 relative to the housing part 40.

In the embodiment, the fluorescent material supporting substrate 35 and the supporting substrate 28a of the cooling member for fluorescent material 28 are brought into directly contact, and thereby, the heat of the fluorescent material 34 is efficiently transferred to the cooling member for fluorescent material 28 via the fluorescent material support ng substrate 35. Therefore, the heat of the fluorescent material 34 is efficiently released.

Figure 8:
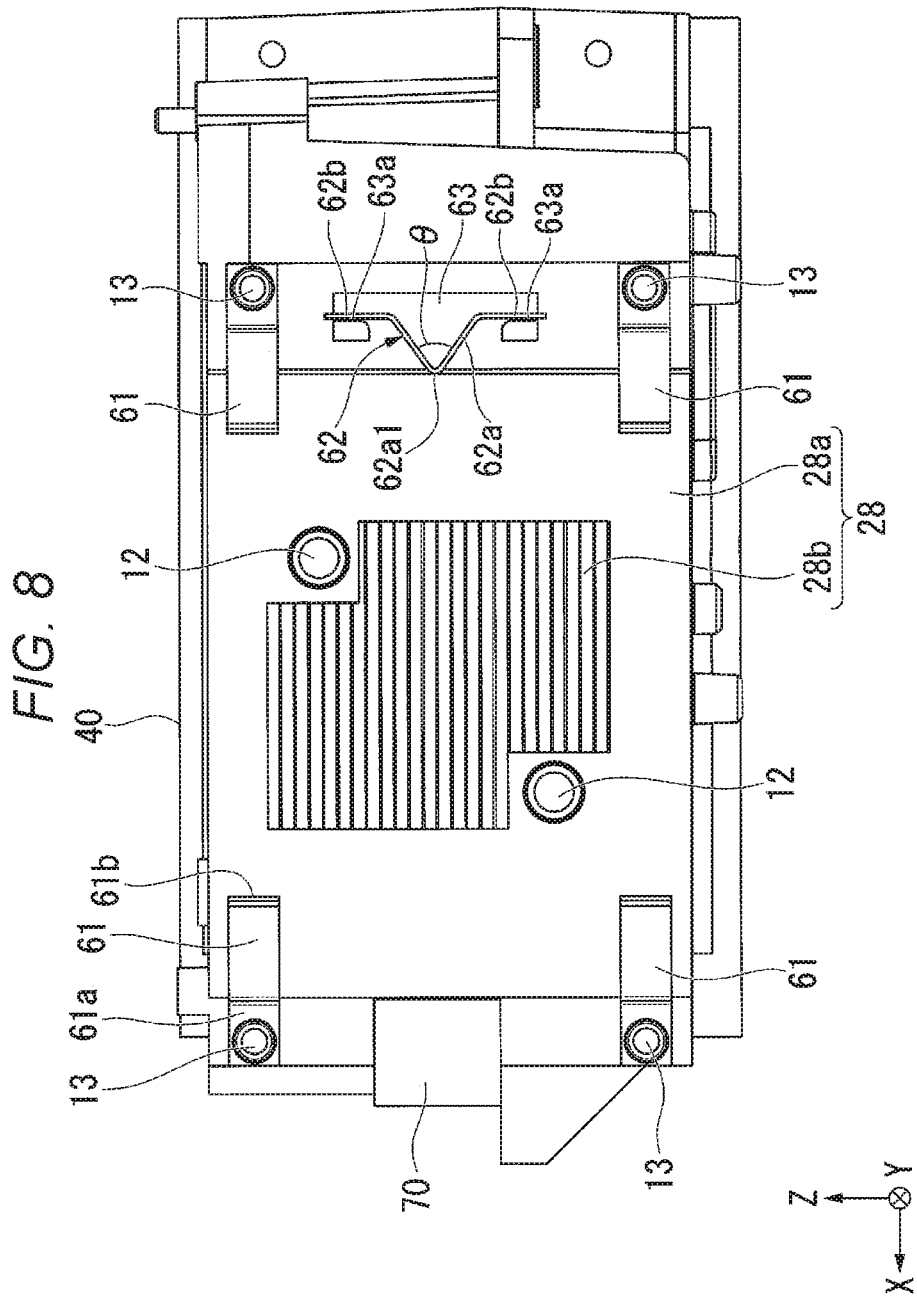
FIG. 8 shows an attachment structure of a cooling member for fluorescent material to the housing part.

FIG. 8 shows the attachment structure of the cooling member for fluorescent material to the housing part. As shown in FIG. 8, with the cooling member for fluorescent material 28 attached to the housing part 40, the first spring members 61 are respectively attached to the four corners of the supporting substrate 28a. One ends 61a of the first spring members 61 are fixed to the housing part 40 by the screw members 13 and the other ends 61b of the first spring members 61 contact the supporting substrate 28a.

The first spring members 61 urge the supporting substrate 28a in the thickness direction (+Y direction). That is, the first spring members 61 urge the cooling member for fluorescent material 28 in the direction to press the member against the housing part 40. Thereby, the fluorescence emitting device 27 fixed to the supporting substrate 28a of the cooling member for fluorescent material 28 may press the elastic member 58 between the holding member 25 and itself as described above (see FIG. 5). Further, the cooling member for fluorescent material 28 may press the elastic member 59 between the housing part 40 and itself (see FIG. 5). Thereby, the elastic member 59 closes the gap produced between the housing part 40 and the cooling member for fluorescent material 28, and may prevent entry of dust into the housing space S within the housing part 40 together with the elastic member 57 and increase dustproof performance of the light source device 2.

The second spring member 62 includes a bent portion 62a and a pair of supporting portions 62b. The top part 62a1 of the bent portion 62a is fixed to the right side (+X side) of the supporting substrate 28a. The pair of supporting portions 62b are provided movably in the upward and downward directions (Z-axis directions) within slits 63a formed in the spring supporting portion 63.

Figure 9:
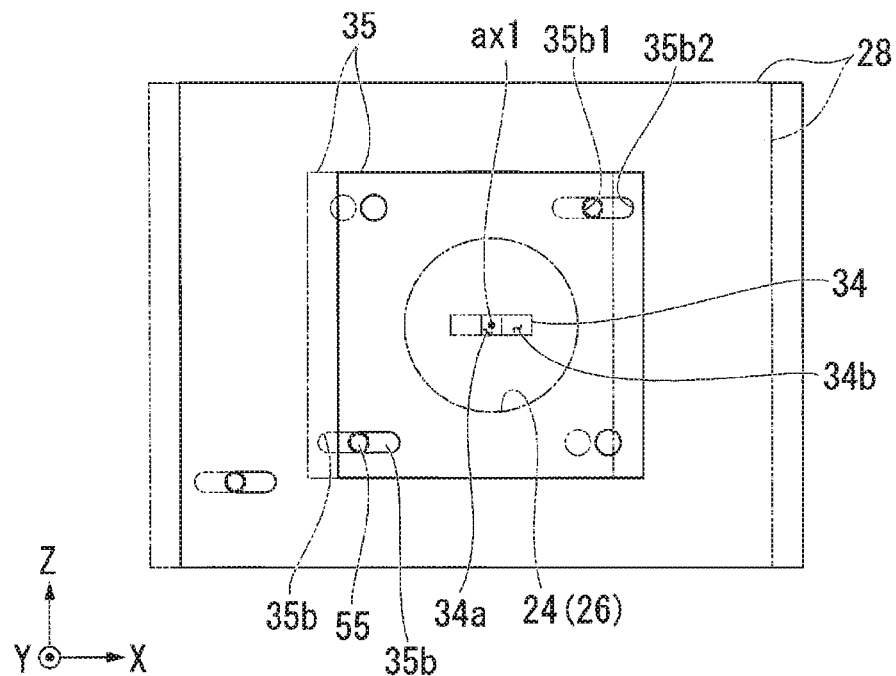
FIG. 9 shows a position relationship between a fluorescent material supporting substrate and a holding member.

FIG. 9 shows the position relationship between the fluorescent material supporting substrate and the holding member. FIG. 9 shows the plan view of the front surface 37 of the fluorescent material supporting substrate 35 from the +Y side. Note that, in FIG. 9, the state before the fluorescence emitting device 27 shifts relative to the housing part 40 by the shift mechanism 70 is shown by a solid line, the state after the shift by the shift mechanism 70 is shown by a dashed-two dotted line, and the members without changes in position before and after the shift are shown by dashed-dotted lines.

As shown in FIG. 9, with the cooling member for fluorescent material 28 attached to the housing part 40, the pins 55 of the lens holding portion 25a are inserted into the elongated holes 35b formed in the fluorescent material supporting substrate 35.

As shown in FIG. 8, with the cooling member for fluorescent material 28 attached to the housing part 40, the second spring member 62 is attached to the spring supporting portion 63 while generating the urging force in a direction in which the bending angle θ of the bent portion 62a of the second spring member 62 is reduced. That is, the top part 62a1 of the bend portion 62a projects to the left side (+X side) and the second spring member 62 urges the supporting substrate 28a to the left side.

The cooling member for fluorescent material 28 is pushed toward the +X side by the second spring member 62 and, as shown in FIG. 9, the pins 55 are pressed against end portions 35b1 of the elongated holes 35b at the −X side. Thereby, the position of the fluorescence emitting device 27 in the leftward and rightward directions (X-axis directions) relative to the housing part 40 is restricted. That is, in the embodiment, the second spring member 62 urges the cooling member for fluorescent material 28 to restrict the shift of the fluorescence emitting device 27 relative to the housing part 40. Concurrently, as shown in FIG. 9, the fluorescent material 34 on the fluorescent material supporting substrate 35 is located at the +X side with respect to the center axis (optical axis ax1) of the collection system 24 of the pickup lens unit 26.

The fluorescent material 34 of the embodiment has the shape elongated along the shift directions (leftward and rightward directions) of the fluorescence emitting device 27 relative to the housing part 40 as described above. Accordingly, as shown in FIG. 9, a first portion 34a at the −X side in the fluorescent material 34 is located on the optical axis ax1.

Further, with the cooling member for fluorescent material 28 attached to the housing part 40, the fluorescent material supporting substrate 35 is in contact with the supporting portions 56 of the lens holding portion 25a. Thereby, the position of the fluorescent material supporting substrate 35 in the optical axis ax1 direction relative to the pickup lens unit 26 is restricted.

In the light source device 2 of the embodiment, the fluorescence emitting device 27 can be shifted in the X-axis directions relative to the housing part 40 by the shift mechanism 70. Specifically, as shown in FIG. 8, the shift mechanism 70 is attached to the left side (+X side) of the supporting substrate 28a of the cooling member for fluorescent material 28 and can shift the supporting substrate 28a to the right side with a larger force than the urging force of the second spring member 62. For example, the shift mechanism 70 includes a slider that slidingly moves by switching of the rotation direction of the motor with reducer and shifts the supporting substrate 28a to the right side with the slider that slidingly moves. Note that the shift mechanism 70 is not particularly limited as long as the mechanism can shift the supporting substrate 28a.

When the fluorescent material supporting substrate 35 is pushed to the right side (−X side) together with the cooling member for fluorescent material 28, the fluorescent material 34 on the fluorescent material supporting substrate 35 shifts to the right side relative to the pickup lens unit 26. In this regard, as shown in FIG. 9, the fluorescent material supporting substrate 35 moves until the pins 55 contact end portions 35b2 at the +X side of the elongated holes 35b (see FIG. 9). That is, the fluorescent material 34 on the fluorescent material supporting substrate 35 can shift in the leftward and rightward directions (X-axis directions) by the amount of the lengths of the elongated holes 35b. In the embodiment, the dimension of the fluorescent material 34 in the leftward and rightward directions coincides with the length of the elongated holes 35b. The pins 55 and the elongated holes 35b have a function of restricting the fluorescence emitting device 27 (fluorescent material supporting substrate 35) to be immovable in the other directions than the leftward and rightward directions and restricting the amount of shift of the fluorescence emitting device 27 in the leftward and rightward directions.

As described above, when the shift mechanism 70 shifts the fluorescence emitting device 27 to the −X side relative to the housing part 40, a second portion 34b at the +X side in the fluorescent material 34 is located on the optical axis ax1.

When the fluorescence emitting device 27 shifts, chippings may be produced because the pins 55 and the elongated holes 35b scrape each other. Further, the fluorescent material supporting substrate 35 contacts the supporting portions 56 of the lens holding portion 25a and, when the fluorescence emitting device 27 shifts, chippings may be produced because the fluorescent material supporting substrate 35 and the supporting portions 56 scrape each other.

When the chippings adhere to the surface of the fluorescent material 34, the chippings may absorb the excitation light and abnormally produce heat and the fluorescent material 34 may be degraded.

On the other hand, according to the light source device 2 of the embodiment, as shown in FIG. 5, the elastic member 58 placed inside of the pins 55 and the supporting portions 56 and closing the gap between the fluorescent material supporting substrate 35 and the holding member 25 is provided, and thereby, the chippings do not adhere to the fluorescent material 34. Therefore, degradation of the fluorescent material 34 due to adherence of chippings is prevented.

Here, the fluorescence emitting device 27 of the embodiment employs the fixed system, and it is difficult to avoid degradation with time in the fluorescent material 34 that is exposed to the high-energy excitation light. When the fluorescent material 34 is degraded with time, reduction of the amount of fluorescence YL occurs.

On the other hand, according to the light source device 2 of the embodiment, the fluorescence emitting device 27 can shift relative to the housing part 40, and thereby, the fluorescent material 34 located on the optical axis ax1 as the optical path of the excitation light BL2 may be changed from the first portion 34a to the second portion 34b.

For example, the light source device 2 of the embodiment may initially generate the fluorescence YL using the first portion 34a of the fluorescent material 34, shift the fluorescent material supporting substrate 35 after a predetermined time lapses, and change to generation of the fluorescence YL using the second portion 34b of the fluorescent material 34.

The light source device 2 of the embodiment may previously detect the amount of fluorescence YL output from the fluorescent material 34 and shift the fluorescent material supporting substrate 35 based on the detection result. For example, the light source device 2 may previously detect the amount of fluorescence YL output from the first portion 34a of the fluorescent material 34 and change to generation of the fluorescence YL using the second portion 34b of the fluorescent material 34 by shifting the fluorescent material supporting substrate 35 when the amount of fluorescence YL is lower than a predetermined threshold value.

According to the light source device 2 of the embodiment, the fluorescence emitting device 27 is shifted relative to the housing part 40 and the incident position of the excitation light BL2 to the fluorescent material 34 is shifted, and thereby, the time before the reduction of the amount of fluorescence occurs due to the degradation of the fluorescent material 34 may be extended compared to a case where the incident position of the excitation light to the fluorescent material is not shifted. That is, the light source device 2 may suppress the reduction of the amount of fluorescence due to the degradation of the fluorescent material 34 and extend the life.

Further, in the light source device 2 of the embodiment, the pickup lens unit 26 that the excitation light BL2 enters is not shifted, and the collection position of the excitation light relative to the fluorescent material 34 does not change. Accordingly, the optical path of the fluorescence YL output from the fluorescent material 34 does not change, and the fluorescence YL output from the light source device 2 efficiently enters the optical component placed at the downstream, e.g. the homogenizer illumination system 36. Therefore, according to the light source device 2 of the embodiment, the light use efficiency of the fluorescence YL may be improved.

According to the projector 1 of the embodiment, the above described light source device 2 is provided and the projector 1 has higher reliability and can display high-brightness images over a long period.

Second Embodiment

Subsequently, a light source device according to the second embodiment will be explained. Note that the difference between the embodiment and the above described embodiment is in the configuration of the fluorescence emitting device. Accordingly, the configurations and members in common with the above described embodiment have the same signs and the explanation thereof will be omitted or simplified.

Figure 10:
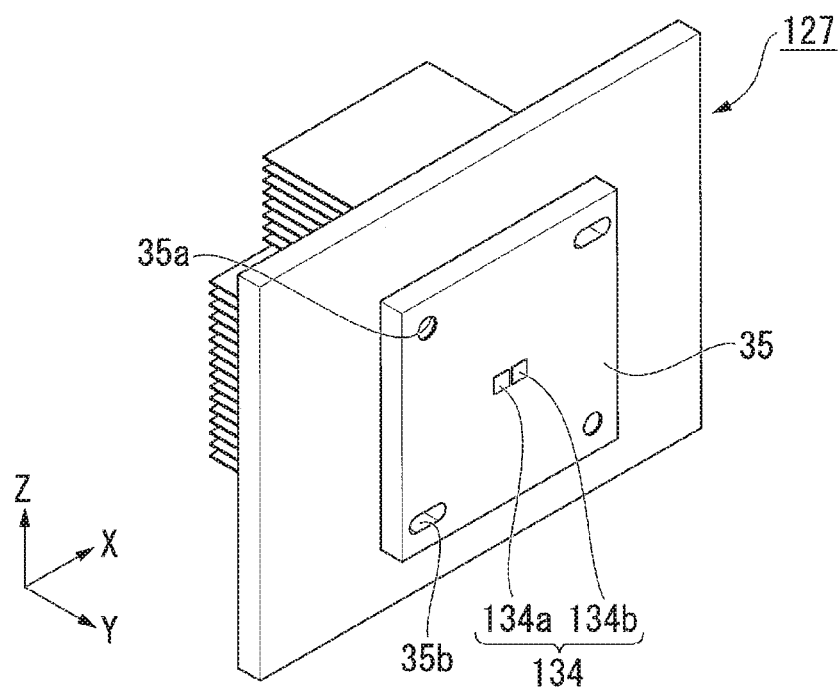
FIG. 10 is a plan view showing a configuration of a fluorescence emitting device of a second embodiment.

As below, the configuration of the fluorescence emitting device will be mainly explained. FIG. 10 is the plan view showing the configuration of the fluorescence emitting device of the embodiment.

As shown in FIG. 10, a fluorescence emitting device 127 of the embodiment has a fluorescent material 134 and the fluorescent material supporting substrate 35 supporting the fluorescent material 134. The fluorescent material 134 of the embodiment includes a plurality of fluorescent material layers That is, the fluorescent material 134 includes first fluorescent material layer 134a and a second fluorescent material layer 134b. The first fluorescent material layer 134a and the second fluorescent material layer 134b are placed side by side in the length directions (X-axis directions) of the elongated holes 35b on the front surface 37 of the fluorescent material supporting substrate 35. That is, the first fluorescent material layer 134a and the second fluorescent material layer 134b are placed side by side in the shift directions (leftward and rightward directions) of the fluorescence emitting device 127 relative to the housing part 40 on the fluorescent material supporting substrate 35.

The fluorescent material 134 of the embodiment includes the first fluorescent material layer 134a and the second fluorescent material layer 134b placed side by side in the shift directions of the fluorescence emitting device 127 relative to the housing part 40. Therefore, according to the fluorescence emitting device 127 of the embodiment, the fluorescent material 134 located on the optical axis ax1 as the optical path of the excitation light BL2 may be changed from the first fluorescent material layer 134a to the second fluorescent material layer 134b.

Accordingly, for example, the light source device using the fluorescence emitting device 127 of the embodiment may initially generate the fluorescence YL using the first fluorescent material layer 134a, shift the fluorescent material supporting substrate 35 after a predetermined time lapses, and change to generation of the fluorescence YL using the second fluorescent material layer 134b. Therefore, the light source device of the embodiment may suppress the reduction of the amount of fluorescence due to the degradation of the fluorescent material 134 and extend the life.

On the other hand, the fluorescent material 134 of the embodiment is formed by the two fluorescent material layers separated from each other, and thereby, harder to be affected by the light guided within the fluorescent material. That is, the excitation light propagating within the first fluorescent material layer 134a does not propagate within the second fluorescent material layer 134b separated from the first fluorescent material layer 134a. Accordingly, degradation of the fluorescent material layer 134b due to the excitation light guided within the first fluorescent material layer 134a may be suppressed. Therefore, according to the fluorescent material 134 of the embodiment, the reduction of the amount of fluorescence due to the degradation of the fluorescent material 134 may be further suppressed and the life may be extended.

In the light source device including the fluorescent material 134 of the embodiment, the reduction of the amount of fluorescence due to the degradation of the fluorescent material 134 may be further suppressed and the life may be extended. Therefore, in the projector including the light source device of the embodiment, high-brightness images may be displayed.

The present disclosure is not limited to the above described embodiments, but changes can be appropriately made without departing from the scope of the present disclosure.

For example, in the above described embodiments, as the light separation element 50, the mirror that transmits part of the incident light and reflects the rest is taken as an example, however, the present disclosure is not limited to that. A polarization beam splitter that separates the pencil of light BL according to the polarization direction may be used.

Further, in the above described embodiments, the projector 1 including the three light modulation devices 4R, 4G, 4B is exemplified, however, the embodiments can be applied to a projector that displays a color picture with a single light modulation device. As the light modulation device, a digital mirror device may be used.

In the above described first embodiment, the fluorescent material 34 has the shape elongated along the longitudinal direction of the elongated holes 35b, however, may have substantially a square shape formed by sides in the same length as that of the long sides of the fluorescent material 34. Note that, when the area of the fluorescent material 34 is smaller, the higher joint force may be obtained more easily when the fluorescent material 34 is joined to the fluorescent material supporting substrate 35 using solder or sintered metal joining agent and the heat resistance of the joint portion may be reduced. Therefore, the rectangular shape as that in the first embodiment is desirable.

In the above described second embodiment, the fluorescent material 134 may include two or more fluorescent material layers.

In the above described embodiments, the example in which the light source device according to the present disclosure is mounted on the projector is shown, however, the device is not limited to that. The light source device according to the present disclosure may be applied to a lighting device, a headlight of an automobile, or the like.

What is claimed is:

1. A light source device comprising:
   a light source;
   a wavelength conversion unit having a fluorescent material excited by a light output from the light source and generating fluorescence and a fluorescent material supporting substrate supporting the fluorescent material;
   a housing part with the light source fixed thereto supporting the wavelength conversion unit;
   a cooling member comprising a heatsink fixed to the fluorescent material supporting substrate and releasing heat generated in the fluorescent material;
   an elastic member provided between the cooling member and the housing part;
   a first urging member comprising at least one first spring that urges the cooling member to the housing part in a first direction; and
   a second urging member comprising at least one second spring that urges the cooling member in a second direction different than the first direction to restrict shift of the wavelength conversion unit relative to the housing part, wherein
   the wavelength conversion unit is shiftably supported relative to the housing part.

2. The light source device according to claim 1, further comprising a shift mechanism comprising a movable slider that shifts the wavelength conversion unit relative to the housing part.

3. The light source device according claim 1, further comprising a collection system unit having a collection system comprising one or more lenses that collects the light output from the light source to the fluorescent material and a holding member that comprises a lens holding portion that holds one or more lenses of the collection system, wherein the holding member is fixed to the housing part.

4. The light source device according to claim 3, wherein a further elastic member is provided between the holding member and the fluorescent material supporting substrate.

5. The light source device according to claim 3, wherein an another elastic member is provided between the holding member and the housing part.

6. The light source device according to claim 1, wherein the fluorescent material includes a plurality of fluorescent material layers, and
   the plurality of fluorescent material layers are respectively placed side by side in shift directions of the wavelength conversion unit relative to the housing part on the fluorescent material supporting substrate.

7. The light source device according to claim 1, wherein the fluorescent material has a shape elongated along shift directions of the wavelength conversion unit relative to the housing part.

8. A projector comprising:
   the light source device according to claim 1;
   a light modulation device that modulates the light from the light source device according to image information; and
   a projection optical device that projects the light modulated by the light modulation device.

9. A projector as in claim 8, wherein said light modulation device comprises a plurality of lights.

10. A projector as in claim 8, wherein said light modulation device comprises a digital mirror.

11. A projector as in claim 8, wherein said projection optical device comprises one or more projection lenses.

12. A light source device comprising:
    a light source;
    a wavelength conversion unit having a fluorescent material excited by a light output from the light source and generating fluorescence and a fluorescent material supporting substrate supporting the fluorescent material;
    a housing part with the light source fixed thereto supporting the wavelength conversion unit;
    a cooling member comprising a heatsink fixed to the fluorescent material supporting substrate and releasing heat generated in the fluorescent material; and
    a first urging member comprising at least one first spring that urges the cooling member to the housing part in a first direction; and
    a second urging member comprising at least one second spring that urges the cooling member in a second direction different than the first direction to restrict shift of the wavelength conversion unit relative to the housing part, wherein
    the wavelength conversion unit is shiftably supported relative to the housing part.

13. A light source device comprising:
    a light source;
    a wavelength conversion unit having a fluorescent material excited by a light output from the light source and generating fluorescence and a fluorescent material supporting substrate supporting the fluorescent material;
    a housing part with the light source fixed thereto shiftably supporting the wavelength conversion unit in the direction orthogonal to the optical axis of the light output;
    a collection system unit having a collection system comprising one or more lenses that collects the light output from the light source to the fluorescent material and a holding member that comprises a lens holding portion that holds one or more lenses of the collection system;
    a first moving restriction mechanism which restricts the shift direction of the wavelength conversion unit relative to the housing part; and
    a second moving restriction mechanism which restricts the shift direction of the wavelength conversion unit relative to the housing part; wherein
    the first moving restriction mechanism has a first elongated hole that is longitudinal in the moving direction of the wavelength conversion unit and a first protrusion,
    the second moving restriction mechanism has a second elongated hole that is longitudinal in the moving direction of the wavelength conversion unit and a second protrusion, and
    the first elongated hole and the first protrusion, and the second elongated hole and the second protrusion, restrict the shift direction of the wavelength conversion unit.

* * * * *